March 21, 1950          G. HERZOG          2,501,174
RADIOACTIVE MEASURING
Filed July 12, 1945
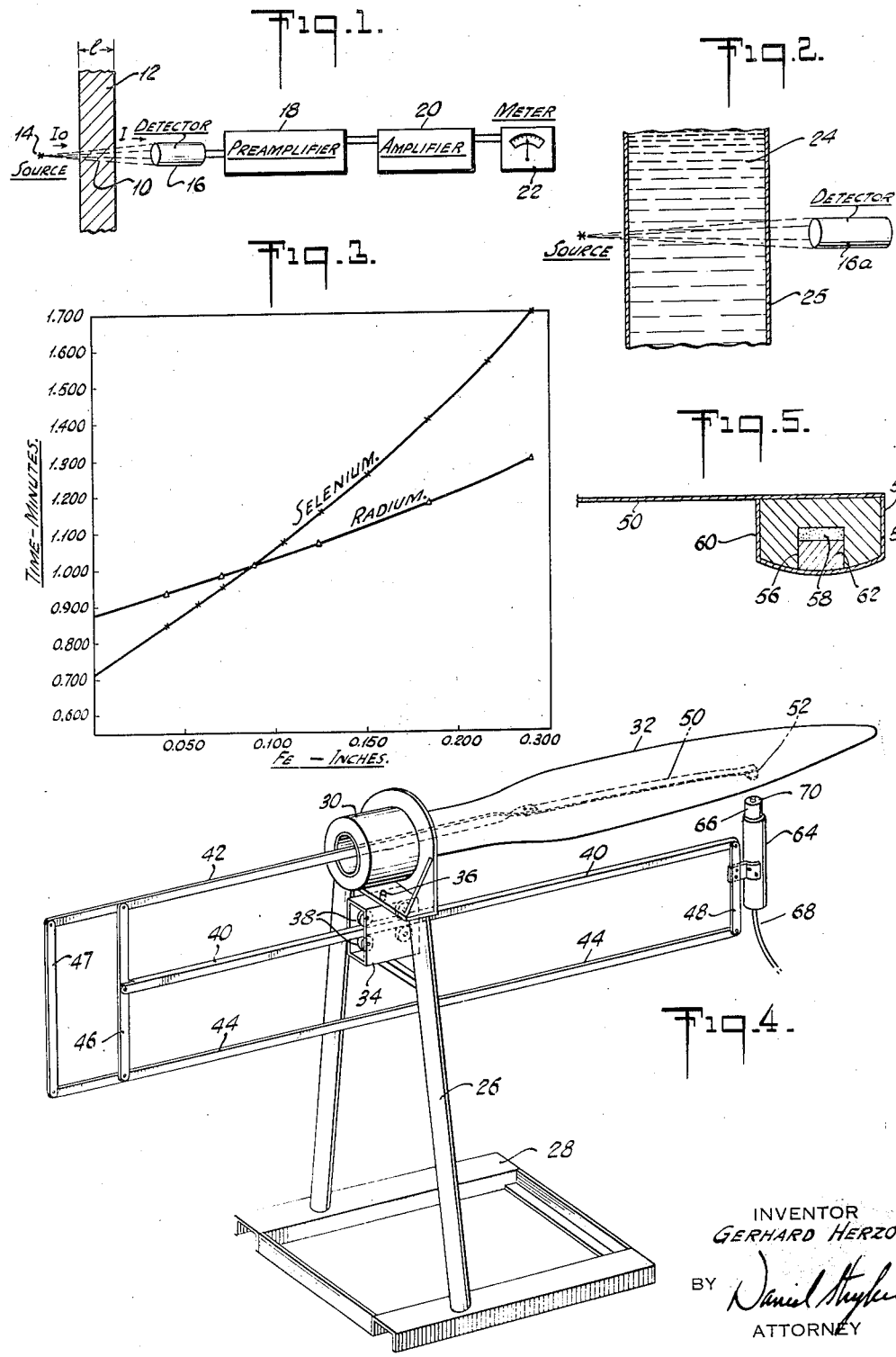
INVENTOR
GERHARD HERZOG.

Patented Mar. 21, 1950

2,501,174

UNITED STATES PATENT OFFICE 2,501,174

RADIOACTIVE MEASURING

Gerhard Herzog, Houston, Tex., assignor to The Texas Company, New York, N. Y., a corporation of Delaware Application July 12, 1945, Serial No. 604,693

5 Claims. (Cl. 250—83.6)

This invention relates to radioactive measuring and particularly to methods in which penetrative radiation such as gamma rays is caused to pass through an object, such, for example, as a plate of steel or other material, to a radiation detector placed at the opposite side of the object, the measured intensity of the transmitted radiation not absorbed by the material of the object providing an indication of the thickness of the object. The invention also contemplates the measurement of a characteristic such as the density of a fluid in a container or a pipe wherein a measurement is made of the intensity of penetrative radiation passing through the fluid. The principal object of the invention is the provision of a method by means of which more accurate measurements than heretofore can be made and without any damage to the object or fluid container such as might otherwise be caused by the drilling of holes therethrough and, in the latter instance, without the necessity for the removal of a sample of the fluid.

As an example of a specific application of the invention a description will be given of the use of the method in connection with the measurement of the thickness of the wall of a hollow propeller blade. In my application, Serial No. 604,694 filed concurrently herewith a method is also disclosed which has particular application to the measurement of hollow propeller blade walls and in my application, Serial No. 604,692 filed concurrently herewith an apparatus for measuring the thickness of propeller blade walls is disclosed and claimed.

In accordance with the present invention a source of radiation comprising an artificially radioactive material emitting radiation such as gamma rays having a predetermined energy is placed at one side of the object the thickness of which is to be measured or at one side of a fluid container and at the other side of the object or container and opposite the source a detector of gamma rays is positioned. The intensity of the gamma rays emitted from the source is reduced by absorption while the rays are passing through the object or through the fluid in the container and the intensity of the emerging ray beam therefore decreases with an increased absorption and the intensity value of this emerging beam as measured with the detector may be calibrated directly in terms of wall thickness in the one instance or in terms of density in the case where it is desired to measure that characteristic of a fluid.

For a better understanding of the invention reference may be had to the accompanying drawing in which:

Figure 1 is a diagrammatic illustration of the measurement of the thickness of a wall, Figure 2 is a sectional elevation through a container or pipe showing the measurement of the density of a fluid therein, Figure 3 is a calibration curve showing the effect of a natural source of radiation, e. g., radium, as compared to an artificially radioactive source such as selenium, Figure 4 is an isometric view of an apparatus for measuring the thickness of a propeller blade wall, and Figure 5 is a vertical sectional elevation through a holder containing an artificially radioactive source.

Obviously, it is advantageous when making radioactive measurements of the thickness of a fairly thin wall or object, e. g., a steel plate of say one-eighth inch more or less in thickness, to provide as large a change as possible in the intensity of the measured transmitted radiation for a given change in thickness of the plate. In a transmission method such as will be described for use in the determination of the thickness of the wall of a propeller blade one is naturally interested in obtaining a high accuracy of the measurements. The accuracy which can be obtained depends to some extent, of course, on the length of time during which an observation is made but in a greater sense it also depends upon the energy of the gamma rays. The use of artificially radioactive substances as the source in the determination of thickness of walls or of densities of fluids has the advantage that the energy of the gamma rays can be properly selected. One can choose a substance whose gamma ray energy is either lower or higher or equal to that of the average gamma rays emitted by radium.

With reference to Figure 1 of the drawing, if a gamma ray beam 10 passes through a wall or plate 12 having a thickness $l$ from a radioactive source 14 to a radiation detector 16, the beam is of course weakened by absorption in the wall. For a given geometrical arrangement, the intensity $I$ reaching the detector 16 is related to the incoming intensity $I_0$ as follows:

$$I = I_0 e^{-kl}$$

where $l$ is the thickness and $k$ is the absorption coefficient of the gamma rays in the material. $k$ depends upon the energy of the gamma rays and is larger, the lower the energy. The relative change in the outcoming intensity I for a change "dl" in wall thickness is given by $$\frac{dI}{I} = -k \times dl$$

This relation shows that the relative change in intensity at the detector is proportional to the absorption coefficient and it is therefore advantageous to make the absorption coefficient as high as possible. This can be accomplished by using gamma rays of low energy. In Figure 1 the detector 16 may take the form of any suitably sensitive device of the counter or ionization type capable of measuring penetrative radiation and the output of the detector is preferably preamplified by means of the device 18, the output of which in turn is led to an amplifier 20 connected to a meter 22 or a recording instrument capable of making a record of variations in the amplified output of the detector 16.

The same principle mentioned in the foregoing paragraph also holds true for the measurement of the density of a fluid 24 in a container or pipe 25 as illustrated in Figure 2. An increase in the absorption coefficient produces a larger change in the intensity of the beam measured at the detector 16a for a given change in the density of the fluid.

A large number of artificially radioactive substances which emit gamma rays of various energies are known and available. Unfortunately, many substances having low energy gamma rays have rather short life times and they are therefore not practicable. Various substances have been investigated and the following results have been found for the change in output of a detector caused by the insertion of 0.128 inch of steel between the detector and the source.

| Substance | Percentage Change |
|---|---|
| Radium | 16 |
| Radioactive Zinc | 17 |
| Radioactive Tellurium | 24 |
| Radioactive Selenium | 31 |

As will be noted from the above table selenium gives the best effect for the substances mentioned and it has a half-life of approximately 180 days. From many measurements over a wide range of thicknesses of the absorbing steel it has been found that radioactive selenium has an absorption coefficient of 2.9 per inch of steel. (This is not the true absorption coefficient because it includes the effect of the varying distance between the source and the detector.) Tests with radioactive cerium show that that substance emits gamma rays of two energies. One group is almost completely absorbed by 0.04 inch of steel with an absorption coefficient of 19 per inch of steel. The more penetrating group has an absorption coefficient of 3 per inch of steel which value is almost identical with that of selenium.

Figure 3 is a calibration curve which shows the effect of a natural source of radiation, e. g. radium, as compared to an artificially radioactive selenium source. The thicknesses of the steel interposed between the source and the detector are plotted as the abscissa and the "time" in minutes for 76,800 pulses in a detector of the counter type is plotted as the ordinate. It will be seen that when using the radium source the slope of the calibration curve is appreciably less than that of the selenium and this demonstrates the advantage of a selenium source. As stated above, selenium has a half-life of approximately 180 days and this means that after a period of 180 days, the intensity of the gamma ray beam has decreased to half of its original value. Obviously this decay is not negligible even over a period of a few days. If one desires to make accurate measurements, the decrease in primary intensity therefore has to be taken into account. It has been found that the decrease for twenty-four hours corresponds to the absorption which is caused by 0.002 inch of steel. If a calibration curve such as is shown in Figure 3 is used, each day an additional 0.002 inch has to be subtracted from the measured thickness. If at any time one does not know the age of the source, a new calibration curve can of course be set up easily. In another procedure one can compare the "time" for a standard radium source with the selenium source using only one thickness of steel.

In certain applications it may be useful to select a radioactive substance which emits gamma rays of higher energies than those of radium. An example of this is the case where relatively large thicknesses of materials are to be measured. In such cases the absorption of gamma rays from radium may be so high that unduly large sources would have to be used in order to obtain sufficient intensity of the outcoming transmitted beam.

It is known that the gamma rays emitted from radium are not homogeneous or in other words, the gamma ray beam contains components having different energies. If such a mixture of gamma rays is absorbed the composition of the beam is continuously changed since the part of low energy is more strongly absorbed than that of high energy. This effect is well known and is called the "hardening" of the beam. The first layers, or rather the first portion of the material of a wall for instance removes relatively more quanta from the beam than the rest of the material and an absorption curve therefore can no longer be expressed as a simple exponential law. Because of this fact there are instances where a radium source cannot be used advantageously but this can be overcome through the use of an artificially radioactive substance which emits gamma rays of approximately the same intensity as does radium. The artificially radioactive substance, however, is so selected as to emit a homogeneous gamma ray beam and its absorption follows strictly an exponential law regardless of the thickness of the material. An example of such a substance is radioactive cobalt which can be commercially manufactured and is available.

As a specific example of an application of this method reference may be had to Figure 4 in which is shown an arrangement of apparatus for measuring the thickness of the wall of a hollow propeller blade at substantially any desired point or points. Due to its irregular shape and the fact that access to the interior can be had only through the shank at the center of the propeller, it is very difficult if not impossible to make measurements with mechanical calipers.

As illustrated in Figure 4, a framework 26 is shown as supported on a base 28 and having at its upper end a bearing 30. The propeller blade 32 is inserted with its shank in the bearing 30 and it is thus possible to rotate the blade about its horizontal axis. Below the bearing 30 a box 34 is mounted on a vertical axle or shaft 36, the box 34 containing two pair of vertically separated rollers 38. A framework or linkage in the form of a pantograph consisting of three horizontal arms or links pivoted to three vertical cross members is adapted for longitudinal movement in the plane of the propeller blade. The middle arm 40 of the frame has a rectangular cross section and is supported and guided between the rollers 38 so that it can be moved horizontally. Due to the roller box 34 being pivoted on the shaft 36 the frame can be rotated to a certain extent in a horizontal plane. The other two horizontal arms 42 and 44 are connected to the middle arm 40 by means of the vertical links 46, 47 and 48 to which they are pivotally connected. The uppermost arm 42 extends into the propeller blade and terminates in a thin flat metal strip 50 which may be attached by riveting, or otherwise, to the end of arm 42. To the end of the strip 50 is attached the holder 52 containing the artificially radioactive source, this element being shown more clearly in Figure 5.

The holder 52 comprises a block 54 preferably formed of a metal having a high density and high atomic number such as lead. It has been found that "Mallory 1000," a machinable alloy which contains over 99% tungsten is very well suited for this purpose. The contact side of the block 54, i. e., the side which engages one surface of the propeller blade wall, is slightly convex as is shown in Figure 5 and this side of the block is provided with an opening 56. The proportions of the block and the hole are such that the walls of the block will be sufficiently thick to absorb to a high degree the gamma rays which are emitted from the source in directions other than toward the blade wall. This is important in order to reduce the scattering effect of adjacent portions of the wall and of the back wall of the propeller blade. The source such as radioactive selenium in the form of $H_2SeO_4$ dissolved in nitric acid and evaporated until a dry powder is obtained is placed in the upper portion of the hole 56 and is indicated at 58 in Figure 5. The lower portion of the hole 56 is then filled with molten paraffin 62 which prevents any dislocation of the radioactive substance within the holder. The block 54 is then placed in a thin cover member 60 of a substance such as aluminum and the device attached by any suitable means to the end of the flexible strip 50.

Attached to the vertical link 48 is a tube 64, this tube serving to support in slidable relation the detector housing 66. The housing 66 rests upon a coil spring, not shown, within the tube 64 which serves to press the upper end of the detector against the outside surface of the propeller blade. Preferably mounted within the lower end of the tube 64 and connected electrically to the detector 66 is a preamplifier for the detector pulses, the preamplifier being connected by a cable 68 to a power supply, amplifier and indicating or recording device as described with reference to Figure 1. The length of the arm 42 is so adjusted that the source 52 is maintained on the longitudinal axis of the tube 64 and a permanent alignment between the source and the detector is thus assured.

After a point on the blade 32 is selected where a thickness measurement is to be made the pantograph frame is moved until the center of the end plate of the detector 66 touches that point. Depending on the shape and curvature of the propeller surface, this may necessitate the rotation of the propeller blade 32 about its horizontal axis, the sliding of the pantograph frame longitudinally, and a slight rotation of the pantograph about the shaft 36. In order to assure that the detector 66 is maintained perpendicular to the selected point on the blade surface, the upper end plate of the detector has at its center a small contact point 70, this point being elevated by $\frac{1}{32}$ inch above the flat surface of the detector plate. As long as the raised point 70 actually touches the blade 32 the longitudinal or vertical axis of the detector can deviate very little from a direction directly perpendicular to the surface of the blade. It has been proven that such a small deviation does not cause any determinable error in the readings.

It will thus be seen that as the pantograph frame is moved forward or backward with or without rotation of the blade in the bearing 30, the upper end of the detector 66 and the source 52 will remain opposite each other and in contact with the opposite surfaces of the blade wall. As stated hereinbefore, more or less of the gamma rays from the source will be absorbed depending upon the amount of wall material between the source and detector and thus upon the thickness of the wall, and by calibrating the meter or recorder such as is shown at 22 in Figure 1, the thickness of the blade at any desired point or points can be read quickly and conveniently.

It is to be understood that while the measuring of the thickness of a propeller blade has been described, this is by way of example only, and the method is applicable where it is desired to measure a characteristic of any object including the density of a fluid in a container, by transmitting penetrative radiation from a source at one side through the object or fluid to a detecting device at the other side. Where measurements are being made of density of a fluid either in a fixed container or passing through a pipe there will of course be a certain amount of absorption of the rays in the walls of the container or pipe. The meter can easily be calibrated to provide a correction for this absorption.

The thickness of the walls of propeller blades which have been measured using the method described herein are approximately from 0.080 to 0.250 inch thick and the accuracy required is usually plus or minus 0.003 inch. It has been found that this accuracy cannot be obtained using naturally radioactive substances as the source of radiation unless prohibitively long measuring times are used. As has been explained in the foregoing, for a given change in thickness, one attains a greater change in detector response by employing rays of low energy from an artificially radioactive source than when employing natural rays as those emitted by radium.

For an additional listing of radioactive substances and their characteristics, reference may be had to the article entitled "Table of isotopes" by G. T. Seaborg which appeared in Review of Modern Physics, volume 16, page 1 et seq. 1944.

Obviously many modifications and variations of the invention, as hereinbefore set forth, may be made without departing from the spirit and scope thereof, and therefore only such limitations should be imposed as are indicated in the appended claims.

I claim:

1. The method of measuring the thickness of a wall which comprises placing at one side of said wall a source of artificially radioactive selenium having a half-life of approximately 180 days, placing at the other side of said wall and opposite said source a radiation detector, and measuring the intensity of the radiation transmitted through said wall and reaching said detector, said measurement providing an indication of the thickness of said wall.

2. The method of measuring the density of a fluid in a container which comprises passing through said container and said fluid from one side to another, gamma rays from a source of artificially radioactive selenium, measuring the intensity of the rays passing through the container and fluid and determining from the measured intensity the density of said fluid.

3. The method of measuring the thickness of a wall which comprises placing at one side of said wall a source of an artificially radioactive material, the emitted radiation from which is homogeneous so that the absorption of said radiation in passing through the wall follows a strictly exponential law as distinguished from the absorption of radiation from a naturally radioactive substance such as radium, disposing at the other side of the wall opposite said source a radiation detector, measuring the intensity of that radiation which reaches the detector after being transmitted through the wall, said measurement providing an indication of the thickness of the wall.

4. The method of measuring the thickness of walls having a thickness range of approximately 0.080 to 0.250 inch which comprises placing near one side of the wall to be measured an artificially radioactive substance from which the emitted gamma rays are all of substantially the same energy and said energy being lower than the average energy of the gamma rays emitted from radium, so that the absorption coefficient for the radiation in the wall material will be higher than the absorption coefficient for the radiation from radium in the same material, disposing at the opposite side of the wall from said source a radiation detector, and measuring the intensity of the gamma rays reaching the detector from said source, said measurement indicating the thickness of said wall.

5. The method of measuring the density of a fluid in a container which comprises placing near one side of said container an artificially radioactive substance from which the emitted gamma rays are all of substantially the same energy so that the absorption of radiation in passing through the container and fluid follows a strictly exponential law as distinguished from the absorption of radiation from a naturally radioactive substance such as radium, disposing at the opposite side of the container a radiation detector, and measuring the intensity of the gamma rays reaching the detector from said source, said measurement indicating the density of said fluid.

GERHARD HERZOG.

REFERENCES CITED

The following references are of record in the file of this patent:

UNITED STATES PATENTS

| Number | Name | Date |
| --- | --- | --- |
| Re. 22,531 | Hare | Aug. 22, 1944 |
| 2,206,634 | Fermi et al. | July 2, 1940 |
| 2,316,239 | Hare | Apr. 13, 1943 |
| 2,346,486 | Hare | Apr. 11, 1944 |